United States Patent [19]

Watanabe

[11] Patent Number: 4,944,217

[45] Date of Patent: Jul. 31, 1990

[54] AUTOMATIC COFFEE BREWING APPARATUS

[76] Inventor: Sharky Watanabe, 31 Deer Creek, Irvine, Calif. 92714

[21] Appl. No.: 379,475

[22] Filed: Jul. 13, 1989

[51] Int. Cl.⁵ ............................................. A47J 31/34
[52] U.S. Cl. ........................................ 99/280; 99/295; 219/308; 219/327; 219/334; 219/493
[58] Field of Search ................. 99/279, 280, 283, 284, 99/295, 300, 304, 305, 306, 307; 219/308, 327, 334, 492, 493; 426/433

[56] References Cited

U.S. PATENT DOCUMENTS

| | | | |
|---|---|---|---|
| 3,351,239 | 11/1967 | Flock | 99/305 |
| 3,371,593 | 3/1968 | Price | 99/307 |
| 4,133,354 | 1/1979 | Lerner | 99/300 |
| 4,725,714 | 2/1988 | Naya | 99/307 |

OTHER PUBLICATIONS

NewBrew Price List, 1-15-88.

*Primary Examiner*—Robert W. Jenkins
*Attorney, Agent, or Firm*—Stetina and Brunda

[57] ABSTRACT

An automatic coffee brewing apparatus and a method for measuring a quantity of water to be used for brewing coffee with a consistent and pleasing taste. The automatic coffee brewing apparatus has a housing formed to receive a replaceable water bottle, reservoir, solenoid valve, electronic controller and boiler. The use of a replaceable water bottle permits the brewing of several decanters of coffee without having to manually add water to the automatic coffee brewing apparatus for each decanter brewed. A measured volume of water is maintained within the reservoir at room temperature. The use of a measured volume of water assures consistency in taste. Maintaining the water at room temperature saves energy. It also prevents scale buildup, thereby improving the taste of the coffee. A second embodiment is disclosed which meters the water through a solenoid valve with a timer.

7 Claims, 5 Drawing Sheets

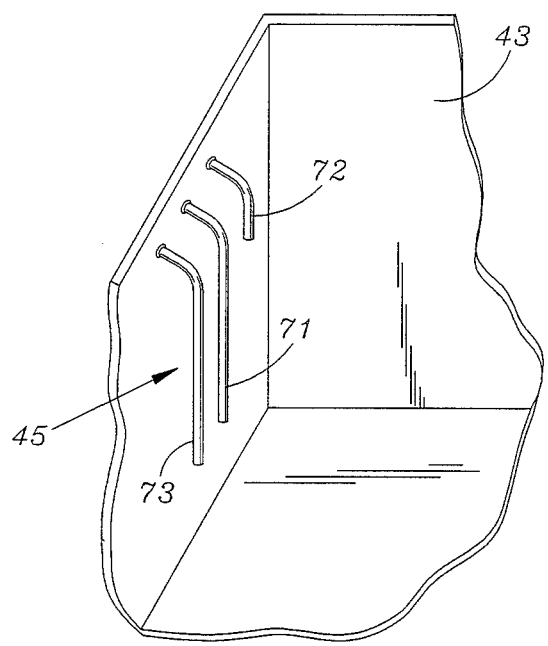
FIG. 7
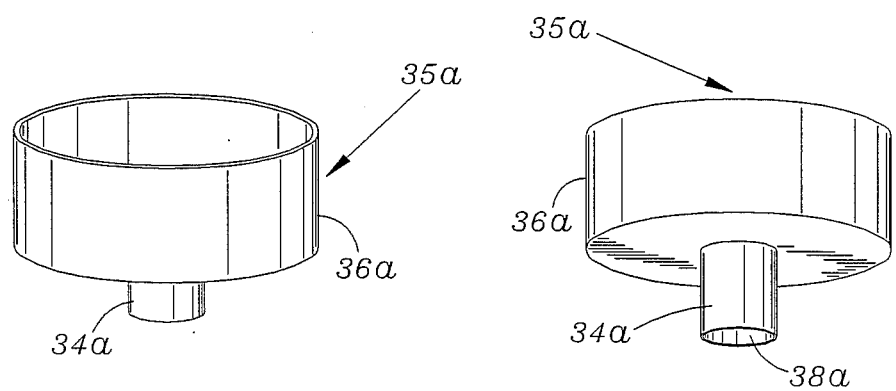
FIG. 8
FIG. 9

AUTOMATIC COFFEE BREWING APPARATUS

FIELD OF THE INVENTION

The present invention relates generally to coffee brewing apparatus and more particularly to an automatic coffee brewing apparatus and a method for measuring a quantity of water to be used for brewing coffee with a consistent and pleasing taste. The automatic coffee brewing apparatus has a housing formed to receive a replaceable water bottle, reservoir, solenoid valve, electronic controller, and boiler in a first embodiment. The use of a replaceable water bottle permits the brewing of several decanters of coffee without having to manually add water to the automatic coffee brewing apparatus for each decanter brewed. A measured volume of water is maintained within the reservoir at room temperature. Pressing a brew button causes the water to flow from the reservoir and into a boiler where it is heated. After passing through the boiler the water is sprayed into a brew cone which contains ground coffee. The heated water passes through the ground coffee and into a decanter which rests upon a heating element. A second embodiment utilizes a timer to meter water from the water bottle, through the solenoid valve, and into the boiler.

BACKGROUND OF THE INVENTION

Automatic coffee brewing apparatus are well known where heated water is sprayed into a brew cone and then drips down into a decanter which rests upon a heating element for keeping the coffee hot. In such prior art apparatus, the water is typically maintained in a reservoir at the temperature required for brewing coffee, generally between 180 and 200° F. This heated water is forced out of the reservoir by the introduction of a like quantity of cold water into the reservoir. The cold water is usually transported from a spigot or bottled water dispenser in the same or a similar decanter as that into which the brewed coffee will drip. The cold water must be manually transported from its source and poured into the coffee brewing apparatus.

Maintaining the elevated temperature of the water stored within the reservoir causes several problems. It requires the constant heating of the reservoir and consequently the constant consumption of electrical energy. Also, maintaining water in a reservoir in a heated condition causes lime and scale to build up therein. The lime and scale are subject to occasional flaking, or breaking off. It then travels with the water into the brew cone, where it affects the taste of the coffee brewed therefrom.

Prior art coffee brewing apparatus are also known which do not store water, but rather are plumbed into either the building water supply or a bottled water dispenser and which utilize a timer controlled solenoid valve to dispense the correct volume of water during the brewing process.

The use of a timer to control the volume of water to be used during brewing has several disadvantages. Timers commonly used in such applications are sensitive to line power fluctuations. The use of another device or appliance on the same electrical circuit as the coffee brewing apparatus, during the time in which the coffee brewing apparatus' timer is being used to measure the volume of water to be used in the brewing process, can result in a line voltage drop sufficient to slow the timer down. This can significantly increase the volume of water delivered. This results in inconsistency in the amount of water used in brewing and therefore also results in inconsistency in the taste of the coffee so brewed.

Timers used in prior art plumbed coffee brewing apparatus are also particularly sensitive to the temperature of the water being metered by the solenoid valve. Since warmer water has a lower density, less of it by weight will be metered into the brewing cone than would be the case with cooler water. Therefore, the amount of water actually used in the brewing process is dependent upon the consistency of the temperature at which the water is delivered to the coffee brewing apparatus.

As such, although the prior art has recognized the problems of having to manually refill the reservoir for each decanter brewed and of being unable to provide a consistently better tasting brew of coffee, the proposed solutions have to date been ineffective in providing a satisfactory remedy.

SUMMARY OF THE INVENTION

In the first embodiment, the present invention is an automatic coffee brewing apparatus and a method for measuring a quantity of water to be used for brewing coffee with a consistent and pleasing taste. The automatic coffee brewing apparatus has a housing formed to receive a replaceable water bottle, reservoir, solenoid valve, and boiler. The use of a replaceable water bottle permits the brewing of several decanters of coffee without having to manually add water to the automatic coffee brewing apparatus for each decanter brewed. A measured volume of water is maintained within the reservoir at room temperature. Pressing a brew button causes the water to flow from the reservoir and into a boiler where it is heated to 212° F. After passing through the boiler the water is sprayed into a brew cone containing ground coffee. The heated water passes through the ground coffee and into a decanter that rests upon a heating element which maintains the temperature of the coffee.

The use of a water bottle eliminates the necessity of either manually refilling the coffee brewing apparatus for each decanter to be brewed or plumbing the coffee brewing apparatus into an external water supply.

Instead of a timer, as used in prior art coffee brewing apparatus, the present invention of the first embodiment uses a water level sensor which causes the reservoir to be refilled when it drops below a predetermined level. Since the reservoir is filled from the room temperature water bottle and since it is maintained at room temperature, the actual amount of water by weight is consistent. This results in a consistent volume of water being used for each decanter brewed. Thereby, consistency is provided in the taste of the brewed coffee.

Also, line power fluctuations do not affect the amount of water being used each time coffee is brewed. This is because the amount of water contained in the reservoir is controlled by a level sensor and is independent of line power.

The use of a water bottle, reservoir with a level sensor, and a boiler results in cleaner, fresher tasting coffee, having a consistency in taste from brew to brew. It also results in convenience since the present invention neither needs to be plumbed into an external source of water nor manually filled for each use. Maintenance requirements are reduced, since lime and scale do not have to be periodically removed from the reservoir.

In the second embodiment, the present invention utilizes a timer, instead of a reservoir having level sensors, to meter the water from the water bottle to the boiler. While the timer is subject to the limitations and problems associated in the prior art, the incorporation of the water bottle in the second embodiment provides a substantial improvement over the prior art.

BRIEF DESCRIPTION OF THE DRAWINGS

FIG. 7 is a perspective view of the level sensor of the first embodiment of the automatic coffee brewing apparatus;

FIG. 8 is a perspective view of the flow orifice of the second embodiment of the automatic coffee brewing apparatus; and FIG. 9 is a perspective view of the flow orifice of FIG. 8 rotated approximately 45° about the horizontal axis.

DESCRIPTION OF THE PREFERRED EMBODIMENTS

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions or sequences may be accomplished by different embodiments that are also intended to be encompassed within the spirit and scope of the invention.

The automatic coffee brewing apparatus of the present invention is illustrated in FIGS. 1-9 which depict two presently preferred embodiments of the invention.

Figure 1:
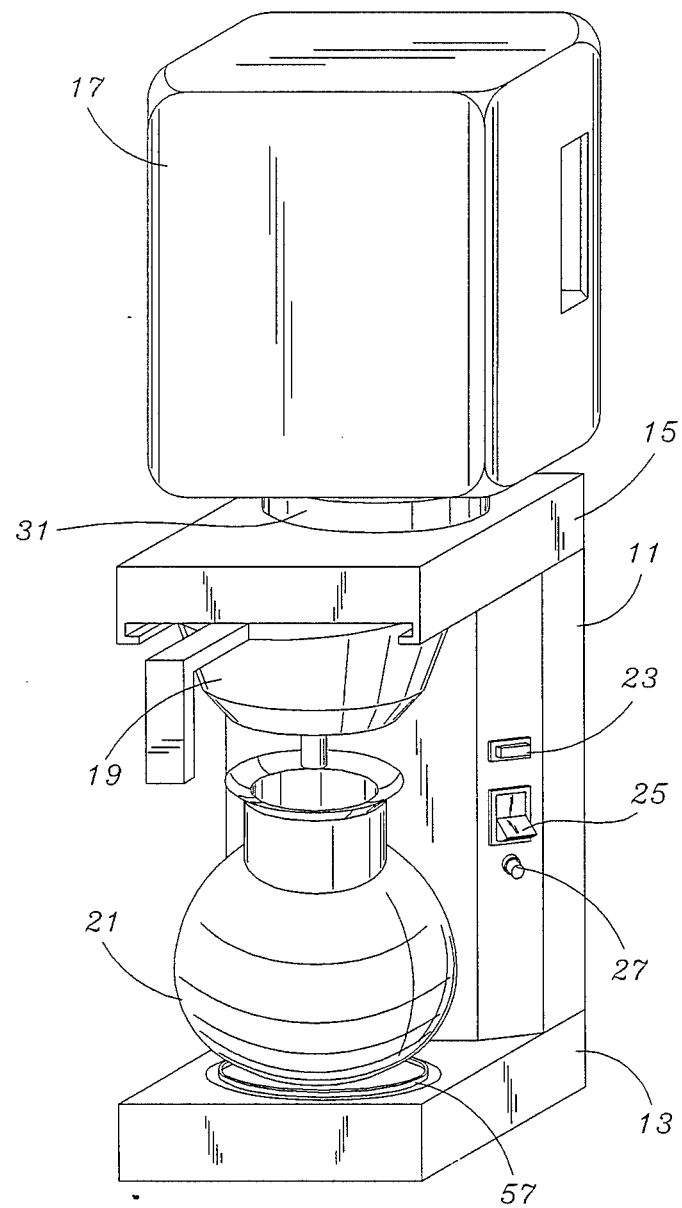
FIG. 1 is a perspective view of the automatic coffee brewing apparatus of the present invention.

Referring now to FIG. 1, the automatic coffee brewing apparatus of the second embodiment of the present invention is depicted generally. The only difference in the external appearance between the first and second embodiment is that the first embodiment has a larger top 15 than the seond embodiment, to accommodate the reservoir 43.

In the coffee brewing apparatus of the present invention a housing 11 has a base 13 and a top 15. A three gallon water bottle 17 is disposed in an inverted position above the top 15 of the housing 11 which is formed to received the bottle and the bottle is supported by an annular support 31 which is attached to the top 15.

As is common in the prior art, a brew cone 19 is used to house the ground coffee and a decanter 21 sits beneath the brew cone 19 to receive the coffee as it is brewed. The decanter 21 rests upon a heating element 57 which maintains the brewed coffee in a warm condition suitable for drinking.

A master switch 25 mounted on the housing 11 is used to supply and remove power to the coffee brewing apparatus. A brew switch 27 initiates a brewing cycle whereby water is sprayed through the ground coffee contained within the brew cone 19 and drains into the decanter 21. A brew indicator light 23 remains lit throughout the brewing process The light 23 extinguishes at the end of the brewing process, indicating to the user that the coffee contained within the decanter is ready for consumption.

Figure 2:
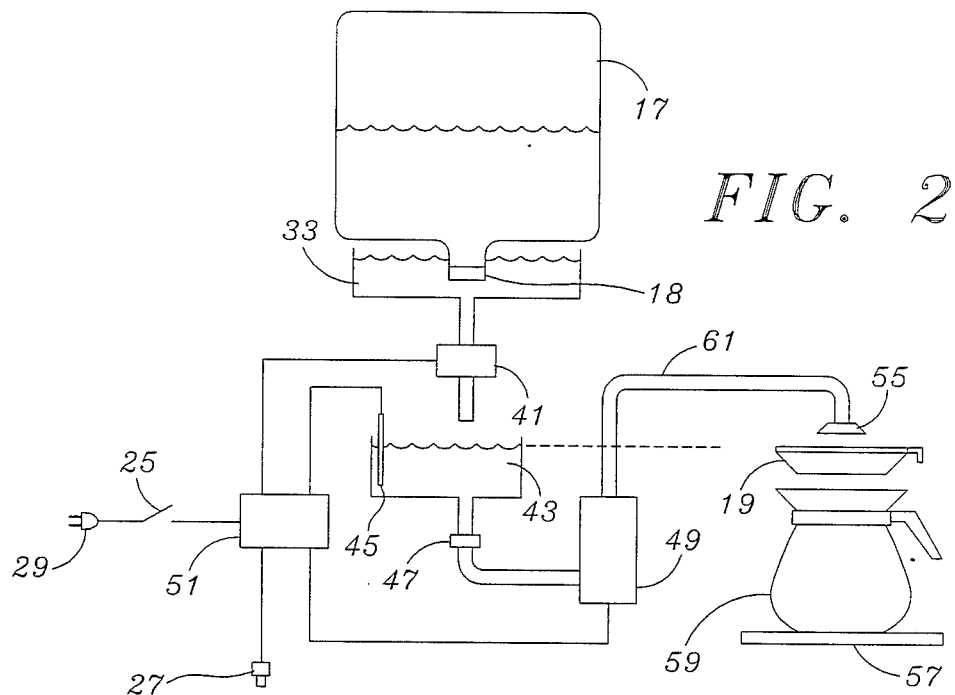
FIG. 2 is a functional diagram of the first embodiment of the automatic coffee brewing apparatus.

Referring now to FIG. 2 the water bottle 17 supplies water through a first valve which is a solenoid valve 41 to a sixty ounce reservoir 43. A solenoid valve such as a Hemco Supply Company, S-30 type vend valve, part number H7055 may be used. Water is gravity fed from the reservoir 43 through a second valve which is a check valve 47 to a heater or boiler 49. The boiler may be fabricated by sealing a heater, such as a Sino-Japan Electric Co., Ltd., Electric Heating Element, part number DL-2, inside a metal enclosure having two fittings for receiving flexible tubing. The boiler 49 is connected to a spray head 55 by a conduit 61 which rises above the level of the water contained within the reservoir 43, as indicated by the dashed line. Therefore, water will not drain from the reservoir 43 through the boiler 49 and spray head 55, since the conduit 61 rises above the level of the water contained within the reservoir 43. The spray head 55 spreads the hot water from the boiler 49 into the ground coffee contained within the brew cone 19. The water then passes through the ground coffee, thereby brewing coffee which is funneled by the brew cone 19 into the decanter 59. A heating element 57, upon which the decanter 59 rests, maintains the brewed coffee at a temperature suitable for consumption.

Figure 6:
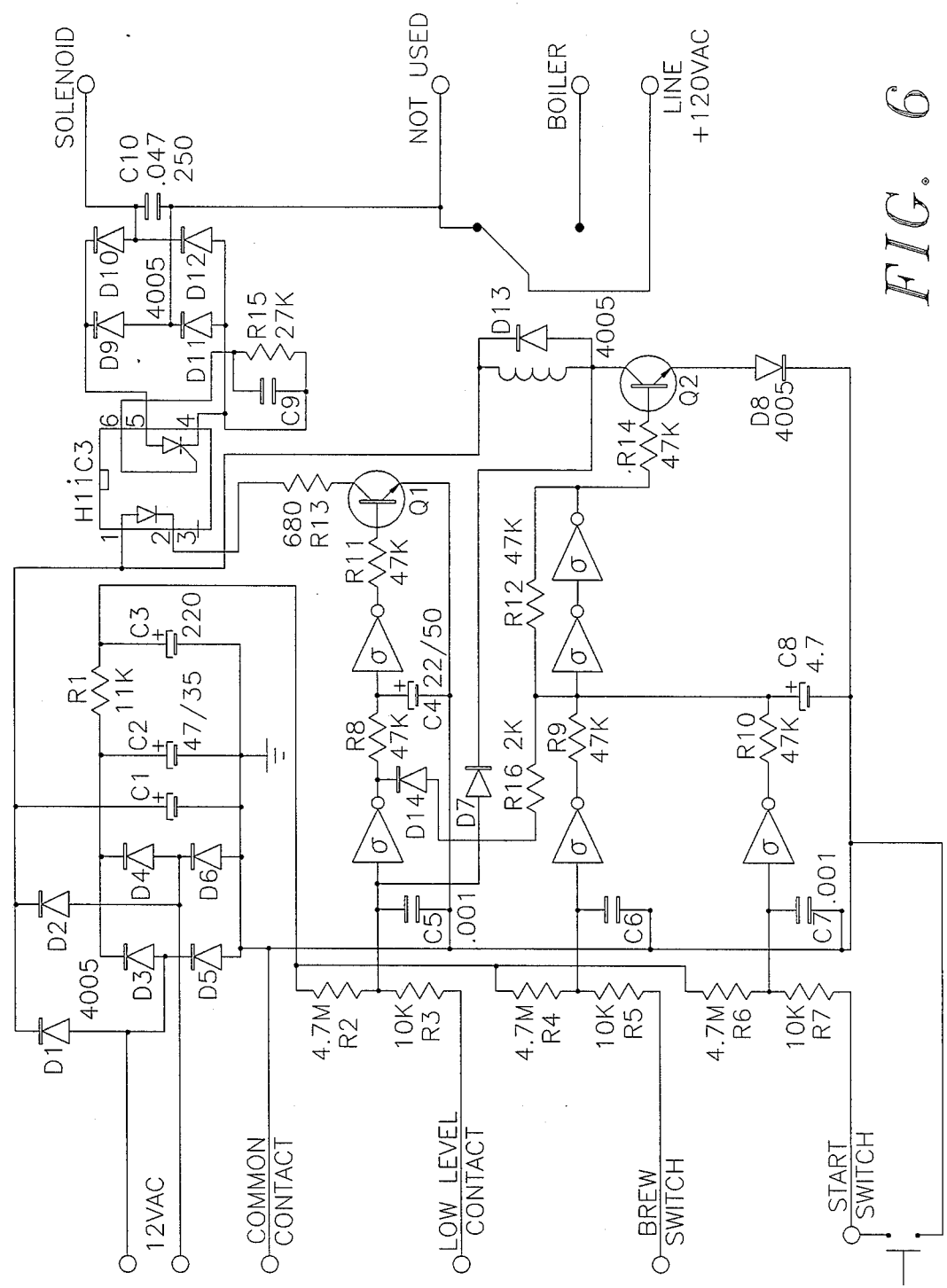
FIG. 6 is an electrical schematic of the controller of the first embodiment of the automatic coffee brewing apparatus.

A controller 51, schematically depicted in FIG. 6, controls the boiler 49, the solenoid valve 41, and is responsive to the level sensor 45, the brew switch 27, and the master switch 25. A bridge circuit comprised of D1 through D6 rectifies current from the 12 volt transformer depicted in FIG. 4. A positive voltage from the rectifier is applied across biasing resisters R2 through R7. These biasing resisters maintain a positive bias on the high level contact and the low level contact with respect to the common contact. This positive bias prevents the buildup of scale, through electrolysis, on the high level and low level contacts. This is particularly important for the high level contact, which does not remain immersed in water continuously. The scale becomes non-conductive if permitted to dry completely. The end of the common contact is always immersed, therefore the common contact is less susceptible to drying of any scale that would build be thereon.

The inverters, capacitors, and resistors cooperate with transistors Q1 and Q2 to provide switch mechanisms to activate the solenoid and boiler respectively. The solenoid is electro-optically isolated from Q1 by H11C3. The boiler is electrially isolated from Q2 by a relay on the collector side of Q2.

Referring now to FIG. 7, the level sensor 45 is comprised of a first or low level contact 71, a second or high level contact 72, and a common contact 73, all electrically connected to the controller 51. The common contact 73 provides an electrical return for the high level contact 72 and the low level contact 71. The low level contact 71 is used to measure continuity through the water and to the common contact 73. Continuity will be indicated by the low level contact 71 and communicated to the controller 51 as long as the water level is high enough to contact both the low level 71 and common 73 contacts. When the water drops below the level where it contacts both the low 71 and common 73 contacts, the absence of continuity will be communicated to the controller, which will respond by deactivating the boiler 49 and opening the solenoid valve 41 to replenish the water with the reservoir 43.

The high level contact 72 is used to measure continuity through the water and to the common contact 73 Continuity will be indicated by the high level contact 72 and communicated to the controller 51 when the water level is high enough to contact both the high level contact 72 and the common contact 73. This requires sixty ounces of water, the amount consumed in each brewing process. As the reservoir 43 fills with water through the open solenoid valve 41, it reaches a level where continuity is sensed by the high level contact 72. Communicating this continuity to the controller 51 causes the controller 51 to deactivate the solenoid valve 41, thereby terminating the flow of water into the reservoir 43.

Figure 4:
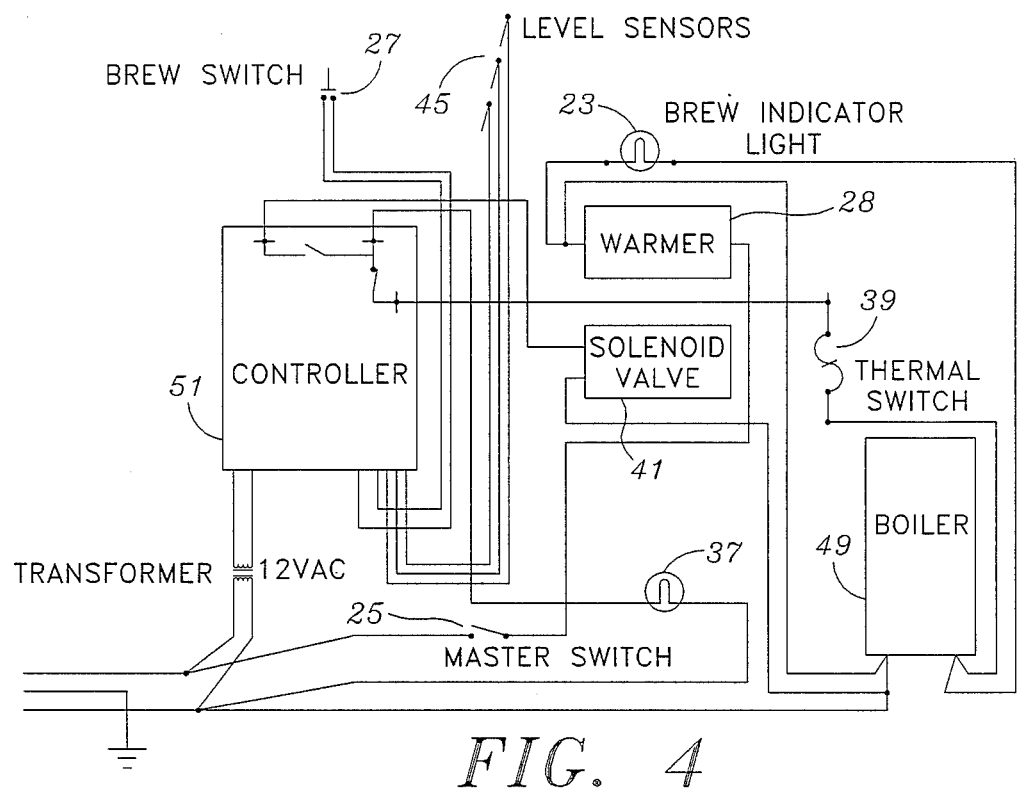
FIG. 4 is an electrical schematic of the first embodiment of the automatic coffee brewing apparatus.

Referring now to FIG. 4, an electrical schematic of the automatic coffee brewing apparatus of the first embodiment is provided. The controller 51 is responsive to the brew switch 27 and the level sensors 45, as well as the master switch 25. The solenoid valve 41 and the boiler 49 are electrically connected and responsive to the controller 51. A power indicator light 37 illuminates when the master switch 25 is closed, thereby indicating the presence of electrical power to the automatic coffee brewing apparatus. A thermal switch 39 protects the automatic coffee brewing apparatus by sensing over temperature of the boiler 49 and causing power to be removed from the boiler 49 when an over temperature condition exists. The brew indicator light 23 illuminates anytime that the boiler 49 is activated. This indicates that brewing is in process. The brew indicator light 23 extinguishes upon completion of the brew process, thereby indicating to user that the coffee is ready to consume. A warmer 28 maintains the termperature of the brewed coffee within the decanter 21.

The operation of the first embodiment of the automatic coffee brewing apparatus is as follows. A water bottle 17 containing a quantity of water is inverted and mounted onto the coffee brewing apparatus with its opening 18 being received by the input port or cavity 33 formed in the top 15 of the housing 11. The cavity 33 will fill with water to a level approximately equal to the height of the opening 18 in the water bottle 17.

To brew a sixty ounce decanter of coffee, first the master switch 25 is toggled to the on position. This activates the controller 51 which is responsive to both the level sensor 45 and the brew switch 27. The level sensor 45 senses that the reservoir 43 is empty, the controller 51 activates the solenoid valve 41. The solenoid valve 41 opens to permit water to fill the reservoir 43. When the water level within the reservoir 43 is at the full level, the level sensor 45 deactivates the solenoid valve 41, causing it to close and terminate the flow water into the reservoir 43. Filling the reservoir 43 also causes water to travel through the check valve 47 under the force of gravity and into the boiler 49 which is also thereby filled. Water continues to flow through the boiler 49 and up into the conduit 61 to a point where the water level within the conduit 61 is equal to the level of the water contained within the reservoir 43, as indicated by the dotted line in FIG. 2.

The automatic coffee brewing apparatus is now ready to brew coffee. Pressing the brew switch 27 initiates the brewing process. The controller 51, being responsive to the brew switch 27, activates the boiler 49, causing the water contained therein to boil. Boiling of the water within the boiler 49 creates pressure which forces the hot water through the conduit 61 to the spray head 55. Water cannot be forced back into the reservoir 43 due to the action of the check valve 47, which only permits flow into the boiler 49. As the water within the boiler 49 boils away sufficiently to reduce the pressure within the boiler 49, water from the reservoir 43, under the force of gravity, passes through the check valve 47 and into the boiler 49. The process repeats until the level of water within the reservoir 43 falls a point where the level sensor 45 causes the controller 51 to deactivate the boiler 49 and activate the solenoid valve 41 to replenish the water within the reservoir 43. With the boiler 49 deactivated, water will once again fills the boiler 49 and the conduit 61 to a point where the water level within the conduit is equal to the level of the water contained in the reservoir 43.

This process of heating the water consumed one full sixty ounce quantity from the reservoir 43 and transferred that quantity into the decanter 59. The hot water travels through the conduit 61 to the spray head 55, through which it was sprayed into the brew cone 19. The hot water then drips down through the ground coffee within the brew cone 19 and is funneled into the decanter 59. A heating element 57 maintains the brewed coffee at a temperature of approximately 180° as long as the master switch 25 is in the on position and a decanter 59 is in place upon the heating element 57. A microswitch, not shown, is depressed by the decanter 59 when the decanter 59 is disposed upon the heating element 57, thereby permitting activation of the heating element 57.

The use of a three gallon water bottle 17 in combination with a sixty ounce reservoir 43 permits the brewing of six decanters of coffee before the water bottle must be changed or filled.

Not maintaining the water held within the reservoir at the temperature required for brewing results in an energy savings, since electricity is not constantly being expended to maintain that temperature. The applicant has estimated the cost savings to be approximately $25.00 per month when compared to a prior art coffee brewing apparatus where both the present invention and the prior art coffee brewing apparatus are brewing four decanters per day.

Also, not maintaining the reservoir at the temperature required for brewing results in approximately 90 to 95% less lime and scale buildup. This both improves the taste of the brewed coffee and reduces the maintenance requirements of the present invention.

Figure 3:
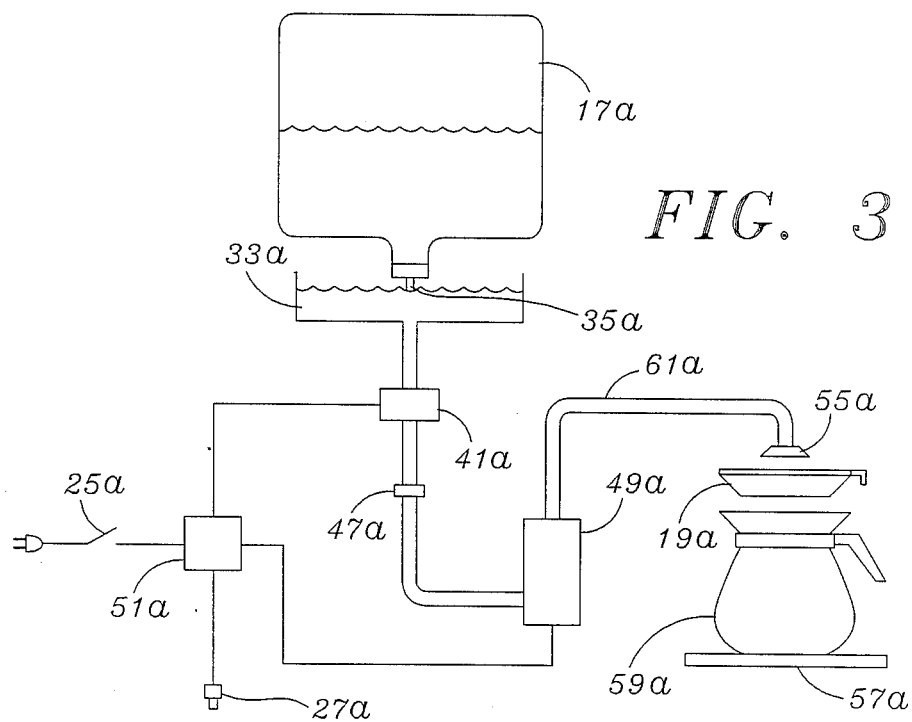
FIG. 3 is a functional diagram of the second embodiment of the automatic coffee brewing apparatus.

Referring now to FIG. 3, a second embodiment of the present invention is depicted. In this embodiment, a water bottle 17a is disposed in an inverted position above an input port or cavity 33a formed in the housing 11. A flow orifice 35a is removably attached to the bottle 17a. Water flow from the cavity 33a is controlled by a first valve which is a solenoid valve 41a. A heater or boiler 49a is connected between the solenoid 41a and a conduit 61a which connects the boiler to a spray head 55a. The pray head 55a sprays hot water into a brew cone 19a. A second valve which is a check valve 47a prevents water from traveling from the boiler 49a to the reservoir 33a when the boiler is activated.

A timer 50a is responsive to a brew switch 27a and a master switch 25a. A timer such as a National Controls Corporation 6-8 minute electronic timer may be used. The timer 50a controls the solenoid valve 41a and the boiler 49a.

Figure 5:
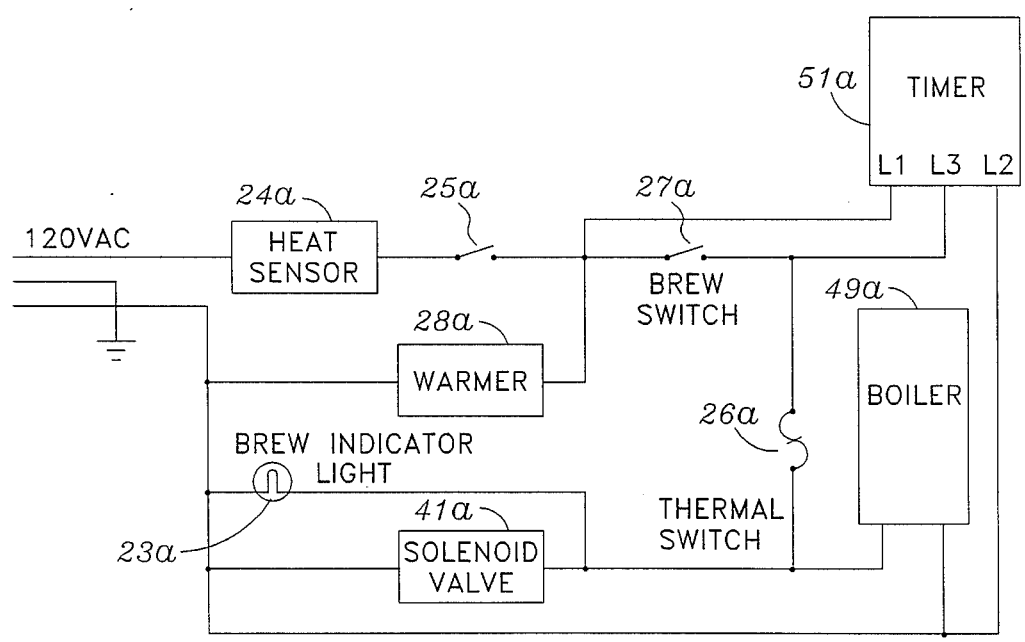
FIG. 5 is an electrical schematic of the second embodiment of the automatic coffee brewing apparatus.

An electrical schematic of the automatic coffee brewing apparatus on the second embodiment is provided in FIG. 5. A master switch 25 provides power to a warmer 28a, a brew switch 27a and a timer 51a. The timer 51a is responsive both to the master switch 25a and the brew switch 27a. When the master switch 25a is closed, 120 volts a.c. is applied across terminals L1 and L2 of the timer 51a. Momentarily closing the brew switch 27a shorts L1 to L3 and activates the timer 51a to supply the input voltage of 120 volts a.c. across terminals L3 and L2 of the timer, thereby applying 120 volts a.c. to the boiler 49a. A high temperature cutoff switch 26a, mounted upon the boiler 49a, will deactivate the boiler 49a upon sensing an over temperature condition. The solenoid valve 41a is likewise responsive to the timer 51a and will remain activated as long as the boiler 49a is likewise activated. The brew light 43a remains illuminated as long as the solenoid valve 41a and the boiler 49a are activated. The warmer 28a remains activated as long as the master switch 25a is on. A heat sensor 24a provides over termperature protection to the the automatic coffee brewing apparatus and will remove power from the automatic coffee brewing apparatus when an over termperature condition is sensed.

The automatic brewing apparatus of the second embodiment is operated as follows. A three gallon water bottle 17a is opened and the flow orifice 35a is attached over the opening. The water bottle 17a is inverted and placed with its opening in the cavity 33a. Water then flows from the water bottle 17a into the cavity 33a until the level of the water in the cavity 33a reaches the level of the opening in the orifice 35a.

When coffee is desired, the master switch 25a is placed in the on position. The brew switch 27a initiates the brewing process. Pressing the brew switch 27a causes the solenoid valve 41a to open and remain open for approximately five minutes as controlled by the timer 51a. The timer 51a also activates the boiler 49a which heats the water. Boiling of the water within the boiler 49a increases the pressure within boiler 49a causing hot water to be expelled through the conduit 61a and sprayed through the spray head 55a into the brew cone 19a. The check valve 47a prevents pressure within the boiler 49a from causing the hot water to travel back through the solenoid valve 41a and into the cavity 33a. The length of time for which the timer 51a keeps the solenoid valve 41a open and the boiler 49a activated is the length of time required for approximately sixty ounces of water to brew through the brew cone 55a and into the decanter 59a. The flow control orifice 35a regulates the rate at which water travels through the solenoid valve 41a to the boiler 49a.

Referring now to FIGS. 8 and 9, the flow control orifice 35a used with second embodiment of the present invention is depicted. This flow control orifice 35a is fabricated of rubber or a rubber-like resilient material in a fashion similar to that of a baby bottles nipple. The shoulder 36a of the flow control orifice 35a is simply slid over the neck of an opened water bottle, and held thereon by frictional engagement The opening 38a in the neck 34a limits the volume of water which will flow through the invention of the second embodiment when the solenoid valve 41a is activated. This assures that the proper quantity of water, sixty ounces, is fed from the bottle 17a to the boiler 49a.

The flow control orifice 35a is also useful in the mounting of the water bottle upon the coffee brewing apparatus. It serves to restrict the flow of water from the bottle while the user is inverting the bottle in order to place it on top of the automatic coffee brewing apparatus. This makes the task of placing the bottle of the automatic coffee brewing apparatus much simpler and reduces the amount of water spilled while performing this task.

It is understood that the exemplary automatic coffee brewing apparatus described herein and shown in the drawings represents only a presently preferred embodiment of the invention. Indeed, various modifications and additions may be made to such embodiment without departing from the spirit and scope of the invention. For example, a motorized or other electrically controlled valve may be used instead of a solenoid valve to regulate the flow of water from the water bottle. Also various other means are well known for measuring the level of the water within the resevoir. Thus, these and other modifications and additions may be obvious to those skilled in the art and may be implemented to adapt the present invention for use in a variety of different applications.

What is claimed is:

1. An automatic coffee brewing apparatus having an input port for receiving a disposable water bottle, the water bottle storing a sufficient volume of water to brew a plurality of decanters of coffee, comprising:
    (a) a housing formed to receive the water bottle;
    (b) a first valve in fluid communication with the input port for controlling the flow of water from the water bottle;
    (c) a reservoir in fluid communication with said first valve for receiving and storing at room temperature a measured quantity of water from the water bottle;
    (d) a sensor for sensing the water level within said reservoir and for generating signals in response thereto;
    (e) a heater in fluid communication with said reservoir for heating the measured quantity of water; and
    (f) a controller for controlling the operation of said first valve and said heater in response to said sensor signals.

2. An automatic coffee brewing apparatus as recited in claim 1 wherein said sensor further comprises:
    (a) a first contact for sensing when the water within said reservoir drops below a first predetermined level; and
    (b) a second contact for sensing when the water within said reservoir raises to a second predetermined level.

3. An automatic coffee brewing apparatus as recited in claim 2 wherein said first valve is a solenoid valve.

4. An automatic coffee brewing apparatus as recited in claim 3 further comprising a second valve disposed intermediate said reservoir and said heater, said second valve being operative to prevent the flow of water from said heater into said reservoir.

5. An automatic coffee brewing apparatus as recited in claim 4 wherein the volume of water contained in said reservoir is approximately sixty fluid ounces.

6. An automatic coffee brewing apparatus having an input port for receiving a disposable water bottle, the water bottle storing a sufficient volume of water to brew a plurality of decanters of coffee, comprising:

(a) a housing, formed to receive the water bottle;

a first solenoid valve, in fluid communication with the water bottle, for controlling the flow of water from the water bottle;

(c) a timer for controlling said valve;

(d) a heater, in fluid communication with said reservoir, for heating the water from the bottle;

(e) a brew switch, said timer being responsive to said brew switch to cause said first solenoid valve to meter a quantity of water from the bottle and into said heater; and (f) a second valve, disposed intermediate said solenoid valve and said heater, said second valve being operative to prevent the flow of water from said heater to said first valve.

7. An automatic coffee brewing apparatus as recited in claim 6 wherein the volume of water metered from the bottle and into said heater by said solenoid valve is sixty fluid ounces.

* * * * *